G. A. UNGAR.
DIFFERENTIAL.
APPLICATION FILED JULY 27, 1917.

1,273,957.

Patented July 30, 1918.

INVENTOR
G. A. Ungar.
BY
Duell, Warfield & Duell
ATTORNEY

UNITED STATES PATENT OFFICE.

GUSTAV A. UNGAR, OF HARTFORD, CONNECTICUT.

DIFFERENTIAL.

1,273,957. Specification of Letters Patent. Patented July 30, 1918.

Application filed July 27, 1917. Serial No. 183,052.

*To all whom it may concern:*

Be it known that I, GUSTAV A. UNGAR, a subject of the Emperor of Austria, residing at Hartford, in the county of Hartford and State of Connecticut, have invented certain new and useful Improvements in Differentials, of which the following is a full, clear, and exact description, such as will enable others skilled in the art to which it appertains to make and use the same.

This invention relates to differentials.

An object of this invention is to provide mechanism for the transmission of power to different shafts simultaneously while permitting adjustment of speed between them to comply with external conditions.

Another object of the invention is to provide a differential which, by permitting a differentiation in the speed of the driven part under the influence of external conditions acting upon the driven part, will insure that the torque of the driving mechanism will be so distributed between the driving parts so as to drive them both, even though one of them be substantially free to rotate.

More specifically, an object of this invention is to provide a differential which when used in driving an automobile will insure that the torque shall be transmitted to whichever wheel secures the better traction on the road.

Another object of the invention is to provide a device of the character described which will be simple and economical in construction and efficient in operation.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
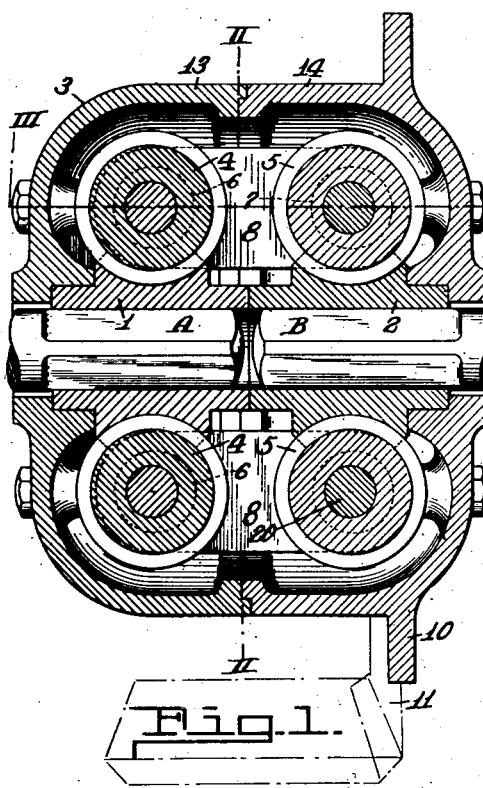
Figure 2:
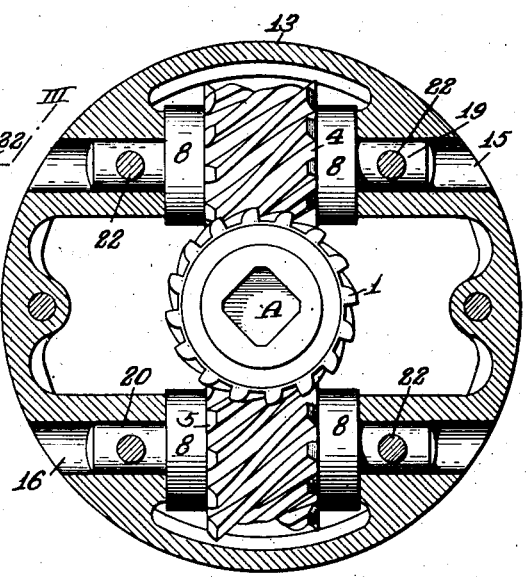
Figure 3:
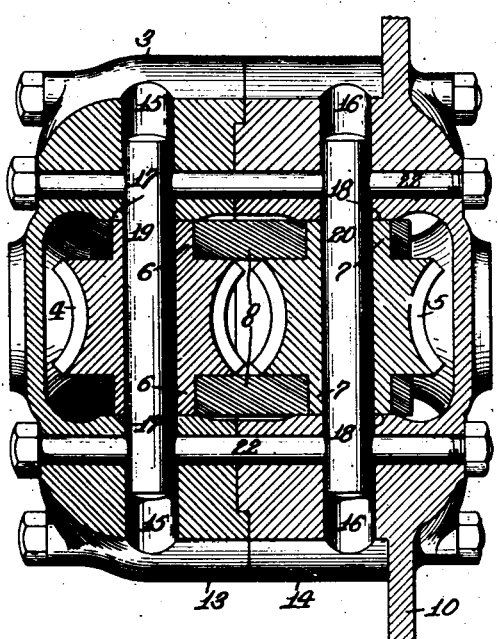
Figure 4:
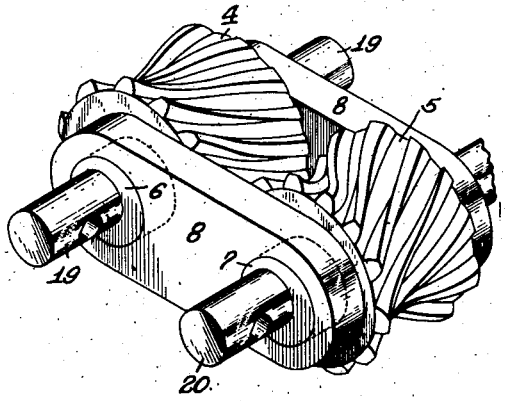

In the accompanying drawings forming part of the specification, wherein similar reference characters refer to similar parts throughout the several views, Figure 1 shows a vertical axial section of a differential embodying this invention;

Fig. 2 is a sectional view along the line II—II, and Fig. 3 is a section on the line III—III of Fig. 1; and Fig. 4 is a perspective view of the worms employed in the differential showing the connection between them.

In the drawings the characters A and B designate two shafts through which it is desired to transmit power differentially. From the embodiment illustrated these shafts are coaxial. Upon each of these shafts on the adjacent ends is provided a screw gear as 1 and 2, one of which, as for example the gear 1, has a right hand pitch, and the other, as the gear 2, has a left hand pitch. Surrounding the gears 1 and 2, and adapted for rotation around the axis of the shaft, whereby it may rotate either with the shaft or around it, is a frame or casing 3, and journaled in this frame in position to mesh with the gear 1 are one or more worms 4, and also journaled in the frame 3 in position to mesh with the gear 2 are one or more worms 5. As illustrated, two worms mesh with each gear. Obviously, the worms 4 will be of right hand pitch and the worms 5 of left hand pitch, corresponding respectively to the pitches of gears 1 and 2. By this construction a rotation of the frame 3 relative to the shafts A and B will be accompanied by the rotation of the worms 3 and 4 around their respective axes, but by reason of the opposite pitch of the gears 1 and 2 a rotation of the worms 4 and 5 in the same direction around their respective axes will correspond to a rotation of the shafts A and B in reverse directions relative to the casing 3.

Power is transmitted to the shafts A and B through the medium of the casing 3 and the worms 4 and 5, and means are provided to lock the worms 4 and 5 against rotation in opposite directions so as to permit the transmission of power to the shafts A and B for driving them in the same direction, which means at the same time permits rotation of worms 4 and 5 in the same direction, whereby opposite rotation of the shafts A and B relative to the casing 3 may be obtained for purposes of differentiation. As illustrated, there is provided upon each of the worms 4 and 5 one or more eccentrics as 6—6 and 7—7, and for the purpose of transmitting the power and distributing the planes symmetrically, one set of eccentrics will be provided upon each end of each worm. The eccentricity of the eccentric on one end of the worm may bear any desired angular relation to the eccentricity on the other end, and in the form illustrated the eccentricities of the two eccentrics are parallel.

A link 8 having bearings adapted to fit over the eccentrics the same distance apart as the axes of the worms 4 and 5, is provided for each pair of eccentrics to coördinate the motion of the worms 4 with that of the worms 5. By this construction rotation of the worms in the same direction is permitted, by the rotation of the eccentrics around their shaft, and the rotary oscillatory movement of the links, but rotation of the worms in the opposite direction is prevented.

For the purpose of transmitting power to the casing, a flange 10 may be provided on the exterior thereof to which is adapted to be bolted a bevel gear 11 which may mesh with any convenient source, as the pinion connected to the prime mover of an automobile.

A practical manner of designing and assembling the parts of the differential is as follows: The casing 3 may be made in two separate parts as 13 and 14, which are identical in construction save that one of the parts as 14 is provided with the flange 10 for the bevel gear 11.

For the purpose of properly balancing the power strains around the gears 1 and 2, it is desirable that more than one worm shall be provided for each gear, which should be circumferentially equally spaced around the gear. The device is more economical to construct when not more than two such worms shall be employed for each gear, as under such circumstances the shafts of the two worms will be parallel, and the machining and finishing of the parts is greatly simplified.

In the drawings, therefore, two worms are shown as meshing with each gear. Under these circumstances, therefore, two holes may be provided in each of the half casings 13 and 14 as 15 and 16. These holes will be symmetrically placed and will be distanced apart by an amount equal to the sum of the diameters of the gears and of the worms, and the interior of the frame will be provided with bearing surfaces as 17 and 18 to receive the end of the worms. The worms themselves will be provided with openings along their axes substantially equal in diameter to the diameter of the holes 15 and 16 in the frame 3, whereby suitable shafts as 19 and 20 may extend through the openings 15 and 16 and serve as journals for the worms.

In order to hold the half casings 13 and 14 together, and at the same time to maintain the shafts 19 and 20 in place, suitable bores as 22 may be passed through the half casing at 13 and 14 and through the end of the shafts 19 and 20.

With the above construction it will be evident that when power is transmitted to the casing 3 through the medium of the bevel gear 11, if the shafts A and B encounter equal resistance to rotation, the casing 3 and the shafts A and B will rotate together at the same speed and in the same direction. While if one of the shafts, as for example, the shaft A, should have any tendency to overrun accompanied by a simultaneous tendency of the shaft B to be retarded, as for example when the differential is employed in an automobile which is turning around a corner whereby the outer wheel tends to rotate faster than the inner, the rotation of the worms 4 and 5 about their axes will occur, so as to permit the shaft A to rotate faster than the frame and the shaft B to rotate slower than the frame. At the same time it is intended that both shafts shall be positively driven and that one shaft shall meet with no resistance because of the friction developed between the worms and the gear.

Thus by the above construction is accomplished, among others, the objects hereinbefore set forth.

As many changes could be made in the above constructions and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent, is:—

1. A device of the character described comprising, in combination, two screw gears of opposite pitch, two worms meshing with each of said gears, and means for connecting said worms together.

2. A device of the character described comprising, in combination, two screw gears of opposite pitch, two worms meshing with each of said gears, and means for connecting said worms together including an eccentric.

3. A device of the character described comprising, in combination, two screw gears, a worm meshing with each of said gears, an eccentric on each of said worms and a link connecting said eccentrics for coördinating the movement of said worms.

4. A device of the character described comprising, in combination, two screw gears of opposite pitch, a worm meshing with each of said gears, eccentrics on the opposite ends of said worms, and links connecting said eccentrics for coördinating the action of said worms.

5. A device of the character described comprising, in combination, two screw gears of opposite pitch, a worm meshing with each of said gears, eccentrics on the opposite ends of said worms and links connecting said eccentrics for coördinating the action of said worm, and a casing in which said worms are mounted, the casing being divided into two sections, a shaft for one of said worms passing through one-half of said casing and a shaft for the other of said worms passing through the other half of said casing, and means for holding the halves of the casing together.

6. A device of the character described comprising, in combination, two screw gears of opposite pitch, a worm meshing with each of said gears, eccentrics on the opposite ends of said worm, and links connecting said eccentrics for coördinating the action of said worms and a casing in which said worms are mounted, the casing being divided into two sections, a shaft for one of said worms passing through one-half of said casing, and a shaft for the other of said worms passing through the other half of said casing, and bolts passing through the halves of the casing and both of said shafts for holding the halves of the casings together.

7. A device of the character described comprising, in combination, two screw gears of opposite pitch, a casing surrounding said gears, a plurality of pairs of worms journaled in said casing, one worm of each pair being in mesh with each of said gears, eccentrics on each of said worms and links connecting each pair of eccentrics.

8. A device of the character described, comprising, in combination, a pair of screw gears of opposite pitch on substantially the same axis, a frame surrounding said gears, two pairs of worms journaled in said frame, one worm of each pair meshing with each of said screw gears, each of said worms having an eccentric on each end and a link connecting the eccentrics of each pair, shafts passing through the frame and serving as journals for the worms, and means for retaining the shafts in place.

In testimony whereof I affix my signature in the presence of two witnesses.

GUSTAV A. UNGAR.

Witnesses:
CLARA B. DENOUCOURT,
HENRY R. TROTTER.